Aug. 19, 1952     A. CHILTON     2,607,189
POWER PLANT, INCLUDING AN INTERNAL-COMBUSTION
ENGINE HAVING EXHAUST TURBINE MEANS
DRIVABLY CONNECTED THERETO

Filed July 11, 1947     3 Sheets-Sheet 1

INVENTOR
ALLAN CHILTON.
BY
ATTORNEY

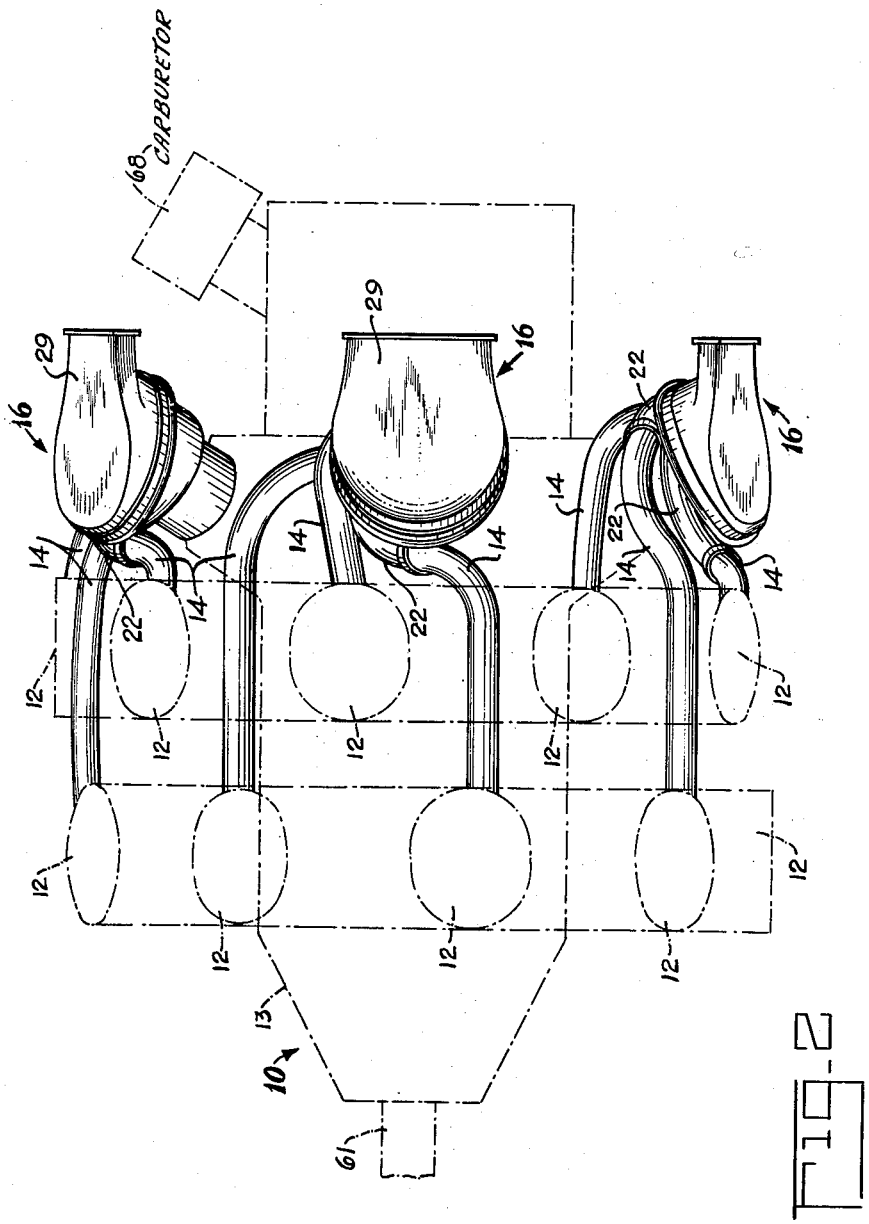

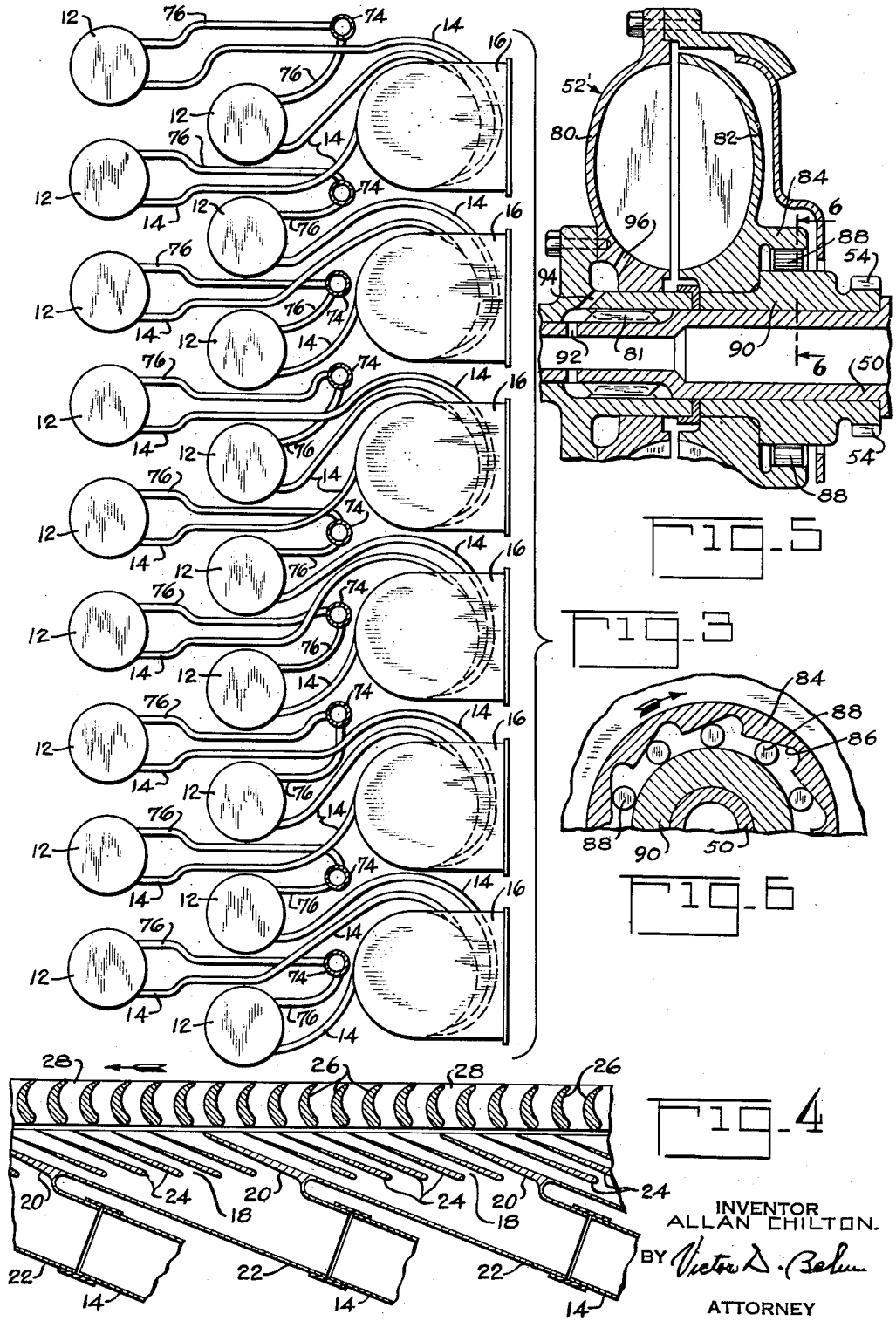

Patented Aug. 19, 1952

2,607,189

UNITED STATES PATENT OFFICE 2,607,189

POWER PLANT, INCLUDING AN INTERNAL-COMBUSTION ENGINE HAVING EXHAUST TURBINE MEANS DRIVABLY CONNECTED THERETO

Allan Chilton, Ridgewood, N. J., assignor to Curtiss-Wright Corporation, a corporation of Delaware Application July 11, 1947, Serial No. 760,385

7 Claims. (Cl. 60—13)

This invention relates to internal combustion engines and is particularly directed to the provision of means for recovering power from the engine exhaust gases.

It is old in the engine art to utilize the energy in the exhaust gases of an engine for driving a turbine; the turbine in turn being drivably connected to a supercharger for the engine and/or to the engine crankshaft—for example, as disclosed in the co-pending application Serial Number 553,092, filed September 7, 1944, in the name of K. A. Browne, now Patent No. 2,518,660. An object of this invention comprises the provision of an engine having a novel turbine arrangement and construction for utilizing the energy in the engine exhaust gases.

A further object of the invention comprises the provision of a plurality of turbine units each being driven by the exhaust gases discharging from certain of the engine cylinders. In addition the turbine units are arranged and mounted so as to facilitate their installation and servicing, and at the same time the turbine units are disposed so as not to increase the overall diameter of the engine power plant.

Other objects of the invention will become apparent upon reading the annexed detailed description in connection with the drawings in which:

Figure 2 is a schematic side elevation of the engine illustrated in Figure 1;

Figure 3 is a diagrammatic developed view of the engine cylinders and turbine units together with the cylinder intake and exhaust pipes; and Figure 4 is a developed view taken along line 4—4 of Figure 1;

Figure 5 is a sectional view illustrating a one-way clutch in the drive connection between each turbine and the engine; and Figure 6 is a view taken along line 6—6 of Figure 5.

Figure 1:
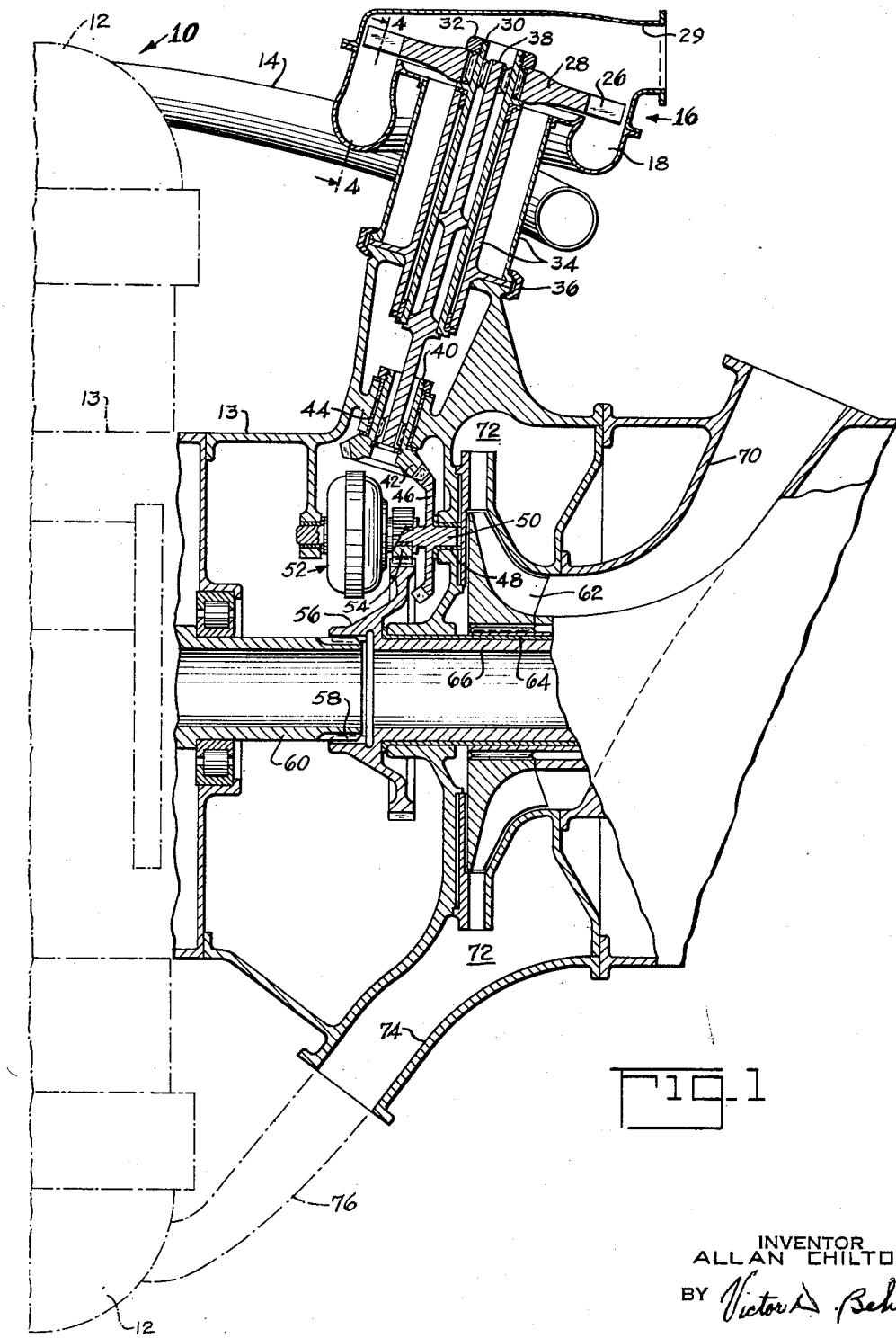
Figure 1 is an axial sectional view through a portion of an internal combustion engine embodying the invention.

Referring to the drawings, the engine 10 is shown as comprising two axially spaced banks of cylinders 12 radially mounted about the engine crankcase 13, each cylinder bank being provided with nine radially disposed cylinders. Each engine cylinder 12 discharges its exhaust gases into an exhaust pipe or passage 14 which extends rearwardly from its associated engine cylinder to one turbine unit 16 of a plurality of such units circumferentially spaced about the engine crankcase and disposed rearwardly of the engine cylinder heads. As best seen in Figure 3, six turbine units 16 are provided, each of said units receiving exhaust gases from a different three of the engine cylinders through their exhaust pipes 14.

As illustrated in Figure 4 each turbine unit 16 is provided with an annular nozzle box 18 which is divided into three similar nozzle sections by partitions 20, each such nozzle section subtending approximately 120° about the turbine axis. The exhaust pipes 14 serving each turbine unit are connected to inlet ports 22 extending from each nozzle section at a small angle to the nozzle box and in the same rotative direction about the turbine axis. In addition each nozzle box 18 is provided with guide vanes 24 for properly directing the engine exhaust gases against the blades 26 of the associated turbine rotor 28. From the turbine blades 26 the exhaust gases of each turbine unit 16 discharge through an exhaust duct provided by a cover member 29 for the associated turbine unit, each said exhaust duct preferably communicating directly with the surrounding atmosphere.

Each turbine rotor 28 is splined to a shaft 30 and is held thereon by a nut 32. Each shaft 30 is suitably journaled in a turbine housing structure 34 rigid with its associated turbine nozzle box 18. Each turbine housing 34 is also rigidly secured to the engine crankcase 13 by suitable means such as a conventional V-clamp 36. Also each shaft 30 is drivably splined to the outer end of a co-axial shaft 38 extending substantially radially from the engine crankcase 13. The inner end of each shaft 38 is splined to the hub 40 of a bevel gear 42 journaled within the engine crankcase at 44. Each bevel gear 42 meshes with a bevel gear 46 journaled within a bearing 48 within the engine crankcase. The bevel gears 46 are each rigidly connected to a shaft 50 which in turn is connected to one of the runners of a conventional hydraulic coupling 52. Said coupling may be similar to that illustrated in co-pending application Serial No. 709,068, filed November 9, 1946, in the name of G. B. Du Bois et al., now Patent No. 2,521,117. The other runner of each said hydraulic coupling is drivably connected to a gear 54 disposed in meshing engagement with a central gear 56 splined at 58 to the engine crankshaft 60.

With the construction so far described, during engine operation, the engine exhaust gases are supplied to the turbine units 16 through their exhaust pipes 14. In addition the rotor 28 of each turbine unit 16 is drivably connected to the engine crankshaft 60 via shafts 30 and 38, bevel gears 42 and 46, a hydraulic coupling 52 and gears 54 and 56. In this way the turbine rotors 28 receive power from the engine exhaust gases and this power is transmitted to the engine crankshaft 60 to add to the engine power output. The driving connection between the turbine rotors 28 and the engine crankshaft 60 is such that the turbine rotors 28 rotate at a much higher speed than the engine crankshaft and the runners of the hydraulic coupling 52 rotate at some intermediate speed.

In starting the engine 10 it is desirable that the turbine rotors 28 be disconnected therefrom to reduce the engine starting load. In addition, if one of the turbines should fail during engine operation, it is desirable to prevent this turbine from imposing a load on the engine. Accordingly each hydraulic coupling 52 may be provided with an automatic valve similar to that illustrated in the aforementioned co-pending application of G. B. Du Bois et al. This automatic valve permits driving torque to be transmitted from the turbine rotors 28 to the engine crankshaft 60 but not in a reverse direction since if the crankshaft should tend to drive any of said turbine rotors, their associated hydraulic couplings would empty to prevent such reverse drive. In lieu of, or in addition to, this automatic control for each hydraulic coupling 52, a conventional one-way clutch (Figures 5 and 6) may be provided in each driving connection between the crankshaft 60 and the turbine rotors 28 to prevent said rotors from being driven from said crankshaft. In this way one or more turbine units 16 may be out of operation without causing the engine 10 to shut-down, and in addition the turbine rotors 28 are not driven when the engine is being started.

Each turbine housing 34 extends substantially radially from the engine crankcase 13 and its turbine 16 is disposed immediately rearwardly of the heads of engine cylinders 12. With this arrangement the turbine units do not add to the overall diameter of the engine and the lengths of the exhaust pipes or passages 14 are quite short. In addition, as best illustrated in Figures 2 and 3, the cylinder exhaust pipes 14 extend part way about and under their associated turbine nozzle boxes 18 whereby each turbine unit 16 may be removed from the engine simply by disconnecting its exhaust pipes 14 and by disconnecting its V-clamp 36. Moreover, access to each turbine rotor 28 is provided simply by removing its cover member 29.

Preferably, each turbine unit 16 is designed as a "blow down" turbine. That is, the effective cross-sectional area of the engine exhaust flow path is not materially reduced through the turbine nozzle box 18 or the turbine rotor blades 26, whereby the addition of the turbine units 16 does not materially increase the back pressure of the exhaust gases on the engine cylinders. Thus the minimum cross-sectional area of the turbine nozzle flow passage, normal to the flow path of the exhaust gases, for each exhaust pipe 14 is at least 80% of the cross-sectional area of said pipe.

With the aforedescribed construction, the hydraulic couplings 52 isolate their respective turbines from torsional vibrations of the engine crankshaft and vice versa. At the same time the provision of a separate hydraulic coupling for each turbine rotor, permits each rotor to operate with a speed variation equal to a small fraction of the slip of the hydraulic coupling thereby reducing the peak loading of the gear teeth in the driving connection between each turbine rotor and the engine crankshaft. Also each engine cylinder has its own or individual turbine nozzle since the partitions 20 divide each turbine nozzle box 18 into three sections each communicating with but one exhaust pipe. Accordingly there is no possibility of the exhaust gases from one cylinder affecting or feeding back into another cylinder.

As illustrated in this application, the engine 10 is provided with an engine driven supercharger 62 disposed in the conventional manner at the rear of the engine and so as to provide a compact arrangement with the turbine units 16. The supercharger 62 is splined to a shaft 64 which in turn is drivably connected to a shaft 66, which in turn is drivably connected to the engine crankshaft 60 through the hub of the gear 56. The shafts 64 and 66 are drivably connected together, preferably by multi speed gearing—for example, as disclosed in Patent Number 2,400,536 issued to R. Chilton.

Air for engine combustion is supplied to the supercharger 62 through a carburetor 68 and an intake duct 70, said supercharger compressing the air into an annular manifold 72. The manifold 72 is provided with outlet ports 74 between the turbine units 16 from which compressed air is supplied to the various engine cylinders 12 through intake pipes 76. The arrangement of said intake pipes relative to the engine cylinders 12 and to the annular manifold 72 is conventional and in order to avoid confusion in the drawing these pipes have been omitted from Figure 2.

In Figures 5 and 6 a conventional one-way clutch has been included in each hydraulic coupling 52' in lieu of the automatic control valve disclosed in the aforementioned application of Du Bois et al. The hydraulic couplings 52 and 52' otherwise are essentially the same. In the modification of Figures 5 and 6 each input shaft 50 of a hydraulic coupling 52' is connected to the input runner 80 of said coupling by splines 81 and the output runner 82 of said coupling is provided with a drum 84 having internal cam surfaces 86 of a conventional one-way clutch. One-way clutch rollers 88 are disposed between said cam surfaces and a cylindrical surface on a shaft 90 formed integral with the gear 54. This one-way clutch structure is conventional and is only schematically illustrated in the drawing.

A suitable liquid is supplied to each hydraulic coupling from the interior of its shaft 50 via passages 92, 94 and 96. With this arrangement the rollers 88 of each one-way clutch engage when the associated turbine helps to drive the engine crankshaft 60 but when said crankshaft tends to drive a turbine 16, the associated one-way clutch overruns. In Figure 6 an arrow indicates the direction the hydraulic coupling 52' is driven by its associated turbine. As illustrated in Figures 5 and 6 each one-way clutch is disposed within the housing of its associated hydraulic coupling. Obviously, however, each said one-way clutch may be disposed at some other location in the driving connection of its associated turbine with the crankshaft 60.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft, each of said turbines including a bladed turbine rotor and an annular nozzle structure for directing engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies engine exhaust gases to only one of said nozzle sections; and means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed radially inwardly of its associated turbine.

2. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft, each of said turbines including a bladed turbine rotor and an annular nozzle structure for directing engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies engine exhaust gases to only one of said nozzle sections; and means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed within said crankcase radially inwardly of its associated turbine.

3. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft and axially spaced relative to said axis from said cylinders, each of said turbines including a bladed turbine rotor having its axis disposed in a generally radial direction relative to the crankshaft axis and including an annular nozzle structure co-axial with its turbine rotor for directing engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies exhaust gases to only one of said nozzle sections, the exhaust gas supply passageways connected to each turbine nozzle structure being connected to said structure on its engine crankcase side; and means including a plurality of hydraulic couplings drivably connecting said turbine rotors to said crankshaft, there being one hydraulic coupling for each of said turbines with each hydraulic coupling disposed in the driving connection of its associated turbine to said crankshaft and with each hydraulic coupling disposed radially inwardly of its associated turbine.

4. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft adjacent one end thereof, each of said turbines including a bladed turbine rotor and an annular nozzle structure for directing the engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies exhaust gases to only one of said nozzle sections; means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed radially inwardly of its associated turbine; a supercharger for said engine disposed co-axially relative to said crankshaft and adjacent to said crankshaft end; and means drivably connecting said supercharger to said crankshaft independently of said hydraulic couplings.

5. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft adjacent one end thereof, each of said turbines including a bladed turbine rotor and an annular nozzle structure for directing the engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies exhaust gases to only one of said nozzle sections; means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed within said crankcase radially inwardly of its associated turbine; a supercharger for said engine disposed within said crankcase co-axially relative to said crankshaft and adjacent to said crankshaft end but more removed from said engine cylinders than said hydraulic couplings; and means drivably connecting said supercharger to said crankshaft independently of said hydraulic couplings.

6. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft adjacent one end thereof, each of said turbines including a bladed turbine rotor and an annular nozzle structure for directing the engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies exhaust gases to only one of said nozzle sections, said passageways dividing said cylinders circumferentially into groups, there being one turbine for and disposed adjacent to each cylinder group such that the exhaust gases of each cylinder group are supplied through its associated passageways to only its adjacent turbine; means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed within said crankcase radially inwardly of its associated turbine; a supercharger for said engine disposed within said crankcase co-axially relative to said crankshaft and adjacent to said crankshaft end but more removed from said engine cylinders than said hydraulic couplings; and means drivably connecting said supercharger to said crankshaft independently of said hydraulic couplings.

7. In combination: a multi-cylinder internal combustion engine having a crankcase with a crankshaft therein; a plurality of engine cylinders mounted on said crankcase and symmetrically spaced about the axis of said crankshaft; a plurality of turbines mounted on said crankcase and symmetrically spaced about the axis of said crankshaft adjacent one end thereof, each of said turbines including a bladed turbine rotor having its axis disposed in a generally radial direction relative to the crankshaft axis and including an annular nozzle structure co-axial with its turbine rotor for directing engine exhaust gases against the blades of said rotor for driving said rotor, each said annular nozzle structure being divided circumferentially into a plurality of sections; a plurality of passageways for supplying engine exhaust gases from said cylinders to the nozzle structure of each turbine such that each cylinder supplies exhaust gases to only one of said nozzle sections, the exhaust gas supply passageways connected to each turbine nozzle structure being connected to said structure on its engine crankcase side, said passageway dividing said cylinders circumferentially into groups, there being one turbine for and disposed adjacent to each cylinder group such that the exhaust gases of each cylinder group are supplied through its associated passageways to only its adjacent turbine; means including a plurality of hydraulic couplings drivably connecting said turbine rotors to said crankshaft, there being one hydraulic coupling for each of said turbines with each hydraulic coupling disposed in the driving connection of its associated turbine rotor to said crankshaft and with each hydraulic coupling disposed within said crankcase radially inwardly of its associated turbine; a supercharger for said engine disposed within said crankcase co-axially relative to said crankshaft and adjacent to said crankshaft end but more removed from said engine cylinders than said hydraulic couplings; and means drivably connecting said supercharger to said crankshaft independently of said hydraulic couplings.

ALLAN CHILTON.

REFERENCES CITED

The following references are of record in the file of this patent:

UNITED STATES PATENTS

| Number | Name | Date |
|---|---|---|
| 1,732,578 | Garuffa | Oct. 22, 1929 |
| 2,127,460 | Chilton | Aug. 16, 1938 |
| 2,128,789 | Anxionnaz | Aug. 30, 1938 |
| 2,305,295 | Lang et al. | Dec. 15, 1942 |
| 2,375,852 | Kilchenmann | May 15, 1945 |

FOREIGN PATENTS

| Number | Country | Date |
|---|---|---|
| 813,297 | France | Feb. 22, 1937 |
| 435,928 | Germany | Oct. 20, 1926 |
| 206,845 | Great Britain | Feb. 21, 1924 |
| 328,263 | Great Britain | Apr. 23, 1930 |
| 579,021 | Great Britain | July 19, 1946 |
| 266,001 | Italy | July 15, 1929 |